(12) United States Patent
Churchill (10) Patent No.: US 12,337,584 B2
(45) Date of Patent: Jun. 24, 2025

(54) HARDFACED PRODUCTS FOR ABRASIVE APPLICATIONS AND PROCESSES FOR MAKING THE SAME

(71) Applicant: ESCO Group LLC, Portland, OR (US)

(72) Inventor: Robin K. Churchill, Aloha, OR (US)

(73) Assignee: ESCO GROUP LLC, Portland, OR (US)

( * ) Notice: Subject to any disclaimer, the term of this patent is extended or adjusted under 35 U.S.C. 154(b) by 1185 days.

(21) Appl. No.: 16/302,080

(22) PCT Filed: Jul. 19, 2018

(86) PCT No.: PCT/US2018/042829
§ 371 (c)(1),
(2) Date: Nov. 15, 2018

(87) PCT Pub. No.: WO2019/018605
PCT Pub. Date: Jan. 24, 2019

(65) Prior Publication Data
US 2020/0270727 A1   Aug. 27, 2020

Related U.S. Application Data (60) Provisional application No. 62/535,099, filed on Jul. 20, 2017.

(51) Int. Cl.
*B22F 5/00* (2006.01)
*B22F 7/08* (2006.01)
(Continued)

(52) U.S. Cl.
CPC .................. *B32B 7/08* (2013.01); *B22F 5/00* (2013.01); *B22F 7/08* (2013.01); *B32B 15/18* (2013.01);
(Continued)

(58) Field of Classification Search
CPC ..... C22C 29/05; C22C 29/062; C22C 1/0475; C22C 32/0057; C22C 1/1036;
(Continued)

(56) References Cited

U.S. PATENT DOCUMENTS 3,406,023 A   10/1968   Loux
3,406,028 A   10/1968   Woock
(Continued)

FOREIGN PATENT DOCUMENTS

CN   101100930 A   1/2008
CN   101178103 A   5/2008
(Continued)

OTHER PUBLICATIONS

Ajayi, et al., "Enhancement of Bronze Alloy Surface Properties by FSP Second-phase Particle Incorporation", In Wear, vol. 376-377, Part B, Apr. 15, 2017, 24 pages.
(Continued)

*Primary Examiner* — Pegah Parvini
*Assistant Examiner* — Marites A Guino-O Uzzle
(74) *Attorney, Agent, or Firm* — Steven Schad; Palmer Dzurella (57) ABSTRACT

A hardfaced product includes a substrate and a hard composite material bonded to the substrate. The composite material includes boron carbide as a wear-resistant material and a matrix alloy including manganese and at least one of copper, silver, gold, platinum or palladium. The hardfaced product can be made by applying a molten matrix alloy to a substrate wherein the matrix alloy is combined with a wear-resistant material. The matrix alloy includes manganese and at least one of copper, silver, gold, platinum or palladium. The wear-resistant material includes boron carbide.

26 Claims, 8 Drawing Sheets

(51) Int. Cl.

| | | |
|---|---|---|
| *B32B 7/08* | (2019.01) | |
| *B32B 15/18* | (2006.01) | |
| *C22C 9/05* | (2006.01) | |
| *C22C 29/06* | (2006.01) | |
| *E02F 9/28* | (2006.01) | |
| *C22C 1/04* | (2023.01) | |

(52) U.S. Cl.
CPC .............. *C22C 9/05* (2013.01); *C22C 29/062* (2013.01); *E02F 9/285* (2013.01); *B22F 2005/001* (2013.01); *B22F 2301/10* (2013.01); *B22F 2302/10* (2013.01); *C22C 1/0475* (2013.01)

(58) Field of Classification Search
CPC ..... C22C 1/1068; C22C 29/067; C22C 29/06; C22C 9/00; C22C 1/1073; B22F 5/00; B22F 7/08; B22F 2005/001; B22F 2301/10; B22F 3/12; B22F 7/04; B22F 7/06; B22F 2007/042; B22F 2998/00; B22F 2999/00; B22F 7/00; B22F 1/10; B22F 3/10; E02F 9/285; B32B 15/18; B32B 2255/205; B32B 5/024; B32B 2260/021; B32B 5/028; B32B 2260/025; B32B 2260/04; B32B 2264/105; B32B 2307/536; B32B 2307/732; B32B 3/20; B32B 3/26; B32B 5/16; B32B 7/02; B32B 7/12; B32B 9/005; B32B 9/047; B32B 9/048; B32B 15/14; B32B 15/16; B32B 2307/554; B32B 33/00; B32B 2264/107; B32B 2264/12; B32B 15/04
See application file for complete search history.

(56) References Cited

U.S. PATENT DOCUMENTS

| | | | |
|---|---|---|---|
| 3,986,842 A * | 10/1976 | Quaas ................ | B23K 35/0283 428/656 |
| 4,554,218 A | 11/1985 | Gardner et al. | |
| 5,049,164 A | 9/1991 | Horton et al. | |
| 8,128,861 B1 | 3/2012 | Aghajanian et al. | |
| 9,211,600 B2 | 12/2015 | Sekine et al. | |
| 2007/0102198 A1 | 5/2007 | Oxford et al. | |
| 2007/0102200 A1 | 5/2007 | Choe et al. | |
| 2009/0256413 A1* | 10/2009 | Majagi ................... | B28D 1/188 299/111 |
| 2012/0258273 A1* | 10/2012 | Churchill ............. | B23K 31/025 428/209 |
| 2017/0051156 A1* | 2/2017 | Chilukuri ................ | C09D 7/67 |

FOREIGN PATENT DOCUMENTS

| | | | | |
|---|---|---|---|---|
| CN | 103290402 A | 9/2013 | | |
| CN | 104018022 A | 9/2014 | | |
| CN | 104093510 A | 10/2014 | | |
| EP | 0439017 A1 | 7/1991 | | |
| GB | 479790 | 2/1938 | | |
| JP | S4842762 B1 | 12/1973 | | |
| JP | H01104407 A | 4/1989 | | |
| TW | 201337071 A | 9/2013 | | |
| WO | WO1993001324 A1 | 1/1993 | | |
| WO | WO-9936590 A1 * | 7/1999 | ......... | B23K 35/0261 |
| WO | WO-2012138916 A1 * | 10/2012 | ............ | B05D 3/02 |
| WO | 2017/027038 | 8/2013 | | |
| WO | WO-2015186095 A1 * | 12/2015 | ............. | B32B 15/00 |
| WO | WO-2017027038 A1 * | 2/2017 | ........... | C22C 29/005 |
| WO | WO2019018605 A1 | 1/2019 | | |

OTHER PUBLICATIONS

V. Constantinescu, R. Orban, H. Colan. Sintering by inltration of loose mixture of powders, a method for metal matrix composite elaboration. Journal de Physique IV Colloque, 1993, 03 (C7), pp. C7-1781-C7-1786. <10.1051/p4:19937282>. <jpa-00251924>.

H. Sheinberg et al., Fabrication and Properties of Copper-Boron Carbide Control Material for Phoebus II Reactor, Los Alamos Scientific Laboratory, pp. 1-15, Mar. 17, 1966.

* cited by examiner

Hard Particles and Infiltrant Particles Mixed Before Infiltration Cycle

Before Infiltration Cycle
Fig. 10A

After Infiltration Cycle
Fig. 10B

Infiltrant Particles Placed Above Hard Particles Before Infiltration

Before Infiltration Cycle
Fig. 11A

After Infiltration Cycle
Fig. 11B

FIG. 12

HARDFACED PRODUCTS FOR ABRASIVE APPLICATIONS AND PROCESSES FOR MAKING THE SAME

"This application claims priority to PCT Application No. PCT/US2018/042829, filed Jul. 19, 2018 entitled "Hardfaced Products for Abrasive Applications and Processes for Making the Same," and U.S. Provisional Patent Application No. 62/535,099, filed Jul. 20, 2017, entitled "Wear Parts for Abrasive Applications". Each of these applications are incorporated by reference herein in its entirety and made a part hereof.

FIELD OF THE INVENTION

The present invention generally relates to wear-resistant products and processes for making the same.

BACKGROUND OF THE INVENTION

Surfaces of tools and other products in contact with abrasive materials are subject to wear. As examples, ground engaging tools and mineral processing tools can have high rates of wear and short service lives.

Many methods of hardening metal surfaces are used to make them more wear resistant. Material selection, alloying and heat treating provide the broadest methods for affecting the hardness and wear properties of tools. Case hardening (carburizing, nitriding, etc.) can provide additional hardness and wear resistance. Hardfacing with wear-resistant materials can provide further increases in service life.

In most types of hardfacing, the deposits incorporate some type of hard particles resistant to wear. Hardfacing can also be done by various methods such as brazing on layers of material containing hard particles or placing hard particles in a mold and pouring or infiltrating metal into the particles.

SUMMARY OF THE INVENTION

The use of boron carbide with a metal matrix can provide a cost effective and/or low density surface to resist erosion of products subject to wear in abrasive environments.

In one embodiment, a hardfaced product includes a substrate and a hard composite material bonded to the substrate. The composite material includes boron carbide as a wear-resistant material and a matrix alloy including manganese and at least one of copper, silver, gold, platinum or palladium. As one example, the hardfaced product can be a ground engaging tool for earth working equipment such as a point for an excavating tooth.

In another embodiment, a hardfaced product has a substrate and a hard composite material including particulate boron carbide and a matrix alloy infiltrated in the boron carbide, wherein the matrix alloy include manganese and at least one of copper, silver, gold, platinum or palladium.

In another embodiment, a hardfaced product has a substrate, a shell welded or brazed to the substrate, and a hard composite material between and bonded to the substrate and the shell, wherein the composite material includes boron carbide and a matrix alloy. The matrix alloy includes manganese and at least one of copper, silver, gold, platinum or palladium.

In another embodiment, a hardfaced wear part includes a substrate and a hard composite material bonded to the substrate. The composite material includes boron carbide particles infiltrated with a metal brazing alloy containing copper and manganese. The matrix material can comprise 15-95% copper and 5-85% manganese.

In another embodiment, a hardfaced wear part includes a substrate and a composite material bonded to at least a portion of the substrate. The composite material includes boron carbide infiltrated with an alloy of copper and manganese, where manganese of the alloy precipitates to the surface of the boron carbide.

In another embodiment, a ground engaging tool has a substrate with a working portion and a mounting portion where the mounting portion includes a rearward opening cavity for mounting the tool to earth working equipment. A composite hardfacing material forms a coating on at least a portion of the substrate, for example, on the working portion. The composite hardfacing material includes a hard particulate material of boron carbide infiltrated with an alloy material of copper and manganese which has a lower melting temperature than the tool substrate. The metallic composite material is bonded to the substrate to connect the composite hardfacing material to the substrate to form a wear resistant tool. In one example, a shell is secured to the substrate to contain the composite material and molten matrix during processing. The composite material is bonded to a shell defining the final shape of the tool working surface. A cavity is defined between the surface of the substrate and the shell, and the composite hardfacing material fills the cavity.

In another embodiment, a hardfaced wear part includes a substrate, a metal shell attached to the substrate (e.g. by welding) to define a space between the substrate and the shell, and a composite material filling the space and forming a coating on at least a portion of the substrate. The composite material includes a particulate boron carbide material infiltrated with a copper manganese based brazing material. In one example, the infiltrating material can bond to the surface of the substrate and to the shell. In another example, the brazing material can be approximately 66 wt. percent copper and 34 wt. percent manganese.

In another embodiment, a method of hardfacing a product includes applying a molten matrix alloy to a substrate wherein the matrix alloy is combined with a wear-resistant material. The matrix alloy includes manganese and at least one of copper, silver, gold, platinum or palladium. The wear-resistant material includes boron carbide.

In another embodiment, a method of hardfacing by infiltration includes placing boron carbide particles in a mold, placing a matrix material containing copper and manganese adjacent the boron carbide and melting the matrix material to infiltrate the boron carbide.

In another embodiment, a method of hardfacing by infiltration includes placing boron carbide particles in a mold, placing a higher density material above the boron carbide, placing a matrix material of copper and manganese adjacent the boron carbide and heating the mold to melt the matrix material and infiltrate the boron carbide. The higher-density material may be in either solid or particulate forms.

In another embodiment, a method of hardfacing by infiltration includes placing boron carbide particles in a mold, placing a matrix material comprising a copper manganese alloy adjacent the boron carbide, melting the matrix material to infiltrate the boron carbide. The manganese forms compounds with the exterior surface of the boron carbide particles to promote wetting and bonding with the matrix material.

In another embodiment, a method of hardfacing by infiltration includes placing a substrate in a mold, placing boron carbide particles in a cavity defined by the mold and substrate, placing a matrix material of copper and manganese adjacent the boron carbide, melting the matrix material, infiltrating the boron carbide material with the molten matrix alloy and bonding the matrix material to the substrate. The method can include forming manganese compounds on the boron carbide surfaces due to reaction with the manganese in the molten matrix material. The method can include annealing the substrate at a temperature above the original melting temperature of the copper manganese alloy where depletion of manganese from the molten matrix material raises the melting temperature of the matrix material. The method can include placing manganese particles or manganese alloy particles in the cavity with the boron carbide particles to replenish manganese in the molten matrix material. The method can include placing manganese coated boron carbide particles in the cavity.

Products receiving hardfacing in accordance with the present invention can include, for example, adapters, picks, buttons, blocks, wear plates, points, shrouds, trommel screens, truck bodies, etc.

Advantages of the present disclosure will be more readily understood after considering the drawings and the detailed description of preferred embodiments.

DETAILED DESCRIPTION OF PREFERRED EMBODIMENTS

Tools used in abrasive environments such as mining are prone to rapid wear, which limits their operational service life. Downtime for replacement of worn parts increases costs for mining operations. Hardfacing applied to the surfaces of the wear parts can extend the service life and reduce costs. Tungsten carbide or other high-cost and/or heavy hard materials are commonly used in the hardfacing to provide the desired wear resistance.

In one embodiment of the invention, a hardfaced product includes a substrate and a hard composite material bonded to the substrate. The composite material includes boron carbide as a wear-resistant material and a matrix alloy including manganese and at least one of copper, silver, gold, platinum or palladium. Such hardfacing can be applied by known processes such as infiltration hardfacing, plasma transferred arc welding, laser welding, HIP cladding, pouring the matrix alloy over the hard material, etc.

In one example, hardfacing by an infiltration process involves putting a porous wear-resistant material in a mold cavity adjacent a substrate, placing a matrix material adjacent the wear resistant material, heating the matrix material to melting to infiltrate the porous material with the liquid matrix material and bond it to the substrate, and then cooling the assembly to form a wear resistant composite material. The resultant composite material includes the matrix material intermixed and bonded to the wear-resistant material. The matrix material bonds together the wear-resistant material and bonds the composite to the substrate. Infiltration can be used to form the wear resistant composite surface on a substrate, such as a part for mining, excavating, or other earthmoving equipment or other product subject to abrasive conditions. The process may optionally be conducted in an inert or reduced atmosphere to preclude oxidation which may interfere with wetting of the hard material by the infiltrant material, but atmospheric conditions may also be used.

Tungsten carbide has commonly been used in such wear-resistant material due to its high hardness and wetting characteristics. However, tungsten carbide has a high density and is generally relatively expensive. The high density adds weight to the components, while the high cost increases the cost of the finished product. Boron carbide generally has a lower density, superior hardness, and generally less cost than tungsten carbide and other commonly used hardfacing materials. A hard surface incorporating boron carbide ($B_4C$) can produce a composite with excellent wear resistance at a lower cost and with less weight added to the product than commonly used wear-resistant materials in hardfacing.

In one embodiment, given only as an example, a composite coating can include wear resistant particles of boron carbide ($B_4C$) and a binding matrix material with a eutectic composition of approximately 66 wt. % copper and approximately 34 wt. % manganese. This composition provides a low melting temperature and can provide suitable results for hardfacing on, for example, ground engaging tools used in mining and other environments. Nevertheless, variations in the composition are possible.

For example, regardless of how the hard composite material is applied, the matrix alloy may include manganese from about 1 wt % to about 50 wt. %, and the balance may be generally copper. A higher level of manganese may also be possible for certain applications. Other materials could be included in the matrix material. For example, silver, gold, platinum and/or palladium may be included along with copper or one or more may be used in lieu of copper. Further, the manganese may be premixed and/or pre-reacted with the boron carbide such that the manganese could be omitted or in a reduced percentage in the matrix alloy. Various forms of boron carbide can be used such as spherical cast $B_4C$, crushed cast $B_4C$, and/or cemented $B_4C$. Other wear resistant particles may be included with the $B_4C$ including, for example, various carbides, nitrides, borides, silicides, etc., provided they are capable of being wetted by and bonded by the infiltrant material. The $B_4C$ could be a majority or minority of the wear resistant material. Such materials may be provided in virgin form and/or with suitable coatings such as metal carbides and/or metal nitrides that promote wetting compatibility and/or resist degradation of the hard particles. The wear resistant material may be provided in other forms such as blocks, preforms, etc.

The matrix alloy can have small amounts of additional elements such as silicon, aluminum, sulfur, phosphorous and/or incidental elements and impurities. Alloying additions can be utilized to achieve different properties and/or microstructures, provided that they do not adversely affect the properties and/or microstructure in an excessive manner, such as unduly increasing the infiltration temperature and/or excessively degrading the properties of the matrix and/or the resultant wear resistant material to a point where a practical use of the process and/or product is no longer attained. The method may also be utilized to create a composite with a metallic matrix material such as bronze, brass or other copper alloys. Concentrations of additional elements can in certain embodiments be approximately 0.01%-10%. Alternatively, concentrations of additional elements may be approximately 0.01%-2%. As used herein, the term "approximately" designates a variance of +/−10% of the nominal values listed (e.g. the endpoints of the composition ranges). In other embodiments, the composition may not include such variances.

The matrix material may be provided in a variety of forms. For example, in one embodiment, the matrix material may be provided in monolithic form, such as one or more blocks, billets, ingots, etc. In another embodiment, the matrix material may be provided in particulate form, such as powder, fibers, whiskers, etc. The matrix material may be provided in a combination of such forms in additional embodiments. In some embodiments, the hard particles are spaced from each other in a cast matrix material. The hard particles can have an average center to center spacing greater than the size or diameter of the particles. Alternatively, the particles are packed and in contact with adjacent particles.

The $B_4C$ material may be in the form of a loose particulate material, such as powder, fibers, whiskers, etc. The method may utilize a wide range of particle sizes in various embodiments, including particle sizes less than 50 μm or particle sizes less than 1 mm. In one embodiment, the particulate may have a particle size that is greater than 0.1 μm. In another embodiment, the particulate porous hard material may have a particle size that is greater than 0.1 μm and up to 5 mm. In a further embodiment, the particulate hard material may have an average particle size of approximately 500 μm. In one embodiment, the hard material may be provided in multiple particle sizes, such as a combination of coarse and fine particles, which combination can be used to achieve greater density and/or volume fraction of the hard material. At any given volume fraction of hard material, such use of fine particles generally leads to finer pore sizes and can increase the yield strength of the matrix material that fills these pores, thereby increasing the overall wear resistance of the material. When the particulate material is placed in a mold cavity, the spaces between the particles form a porous structure that may be infiltrated by the matrix material.

The hard material may alternatively be in the form of a porous or non-porous preform. The porosity of the porous preform can range from 5% to 95% in one embodiment. As one example, the porous preform may include a particulate material that is bonded together by a binder material, such as a polymer binder. A preform may be attached to the substrate material, such as by an adhesive that will volatilize during the infiltration process. The binder and adhesive material will volatilize as the materials are heated in the infiltration cycle and the matrix material can fill the pores left by the removal of the binder in addition to the pores between the particles. In another example, the porous preform may include a particulate material that is bonded together by sintering so that pores exist between the particles.

A pre-sintered preform may have a pore size that is on the order of the particle size, since the part may be sintered slightly to achieve neck growth between particles and provide some mechanical handling strength. Other hard material forms may be used as well, such as woven fiber mats or fabrics. In a further embodiment, the hard material may be provided in a combination of different forms. For example, in one embodiment, the hard material may include one or more preforms forming a portion of the hard material, with other portions being formed by a particulate material (e.g. loose powder, fibers, whiskers, etc.) and/or woven fiber mats or fabrics.

In some embodiments, infiltration will be limited where the porosity of the hard particles is greater than 60%. In some embodiments infiltration will be limited where the particle size is greater than 1000 micrometers.

Infiltration processes employ a spacing between particles that allow capillary forces to dominate over gravitational forces. Where larger particles are used or particles or portions are more widely-spaced, capillary action during processing is limited. In this case the particles are cast in place rather than infiltrated. Some advantages may be attained by combining larger hard particles with smaller particles prior to infiltration. Pouring metal onto large particles is distinct and different than infiltration, but could also be used.

Figure 10A:
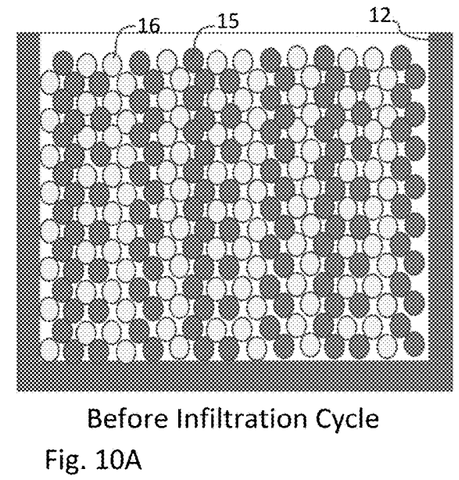
FIG. 10A is a schematic representation of matrix particles mixed with hard particles in a mold.
Figure 10B:
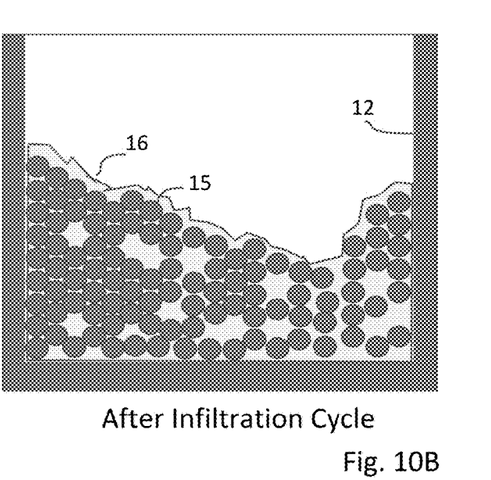
FIG. 10B is a schematic representation of matrix particles and hard particles of FIG. 10A after melting of the matrix particles.

Infiltration is preferred as it provides a more accurate and repeatable finished product than premixing matrix and hard particles or pouring molten metal over particles. Premixing the composite components as seen in FIGS. 10A and B can result in displacement of the hard particles as the matrix material is heated to melting temperature. The composition of the coating may be inconsistent with concentrations of hard particles in some areas and depletion of hard particles in others. Surface texture can also be inconsistent.

Figure 11A:
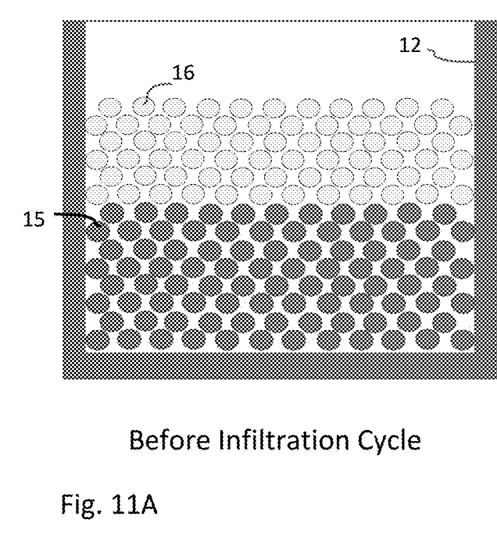
FIG. 11A is a schematic representation of matrix particles positioned over hard particles in a mold.
Figure 11B:
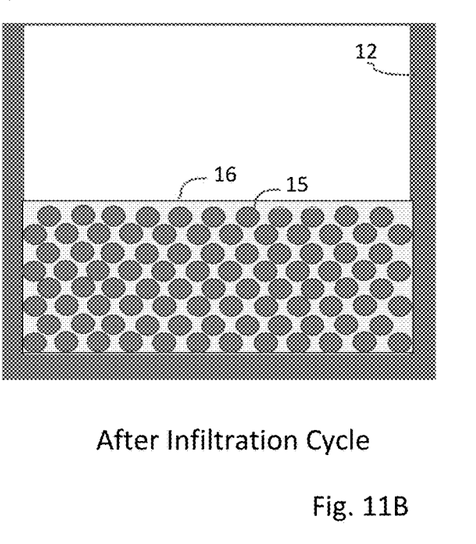
FIG. 11B is a schematic representation of the matrix particles and hard particles of FIG. 11A after melting of the matrix particles.

In an infiltration process, a layer of matrix material 16 is adjacent the separate hard particles 15 in a mold 12 as shown in FIG. 11A. The hard particles start out in contact with each other and the particles remain in substantially the same position after the liquid infiltrant material is introduced. Thus, the dimensions of the composite tend to be similar to the dimensions of the porous hard particle layer prior to infiltration as seen in FIG. 11B.

Figure 1:
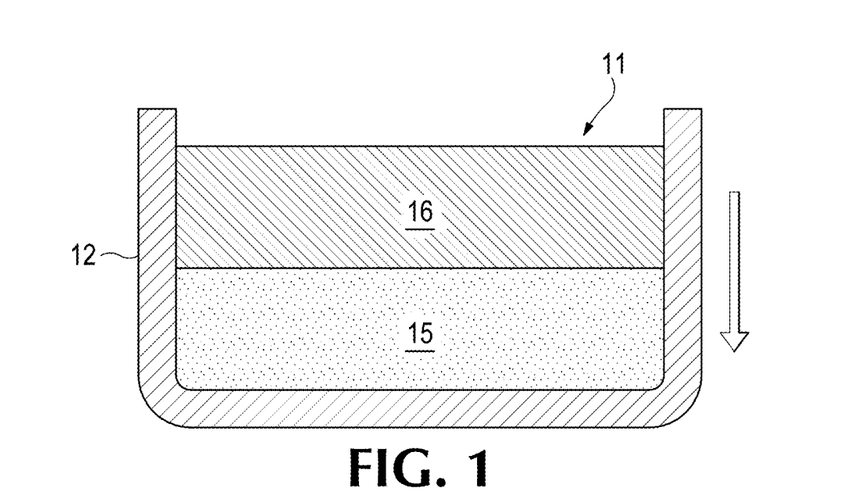
FIG. 1 is a schematic illustration showing an example of vertical infiltration from above to form a wear resistant composite material, according to one embodiment of the present invention.
Figure 2:
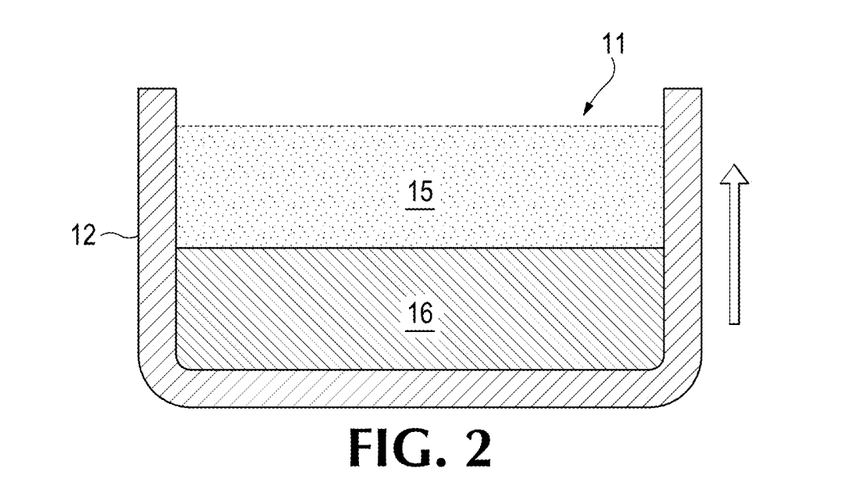
FIG. 2 is a schematic illustration showing an example of vertical infiltration from below to form a wear resistant composite material, according to one embodiment of the present invention.
Figure 3:
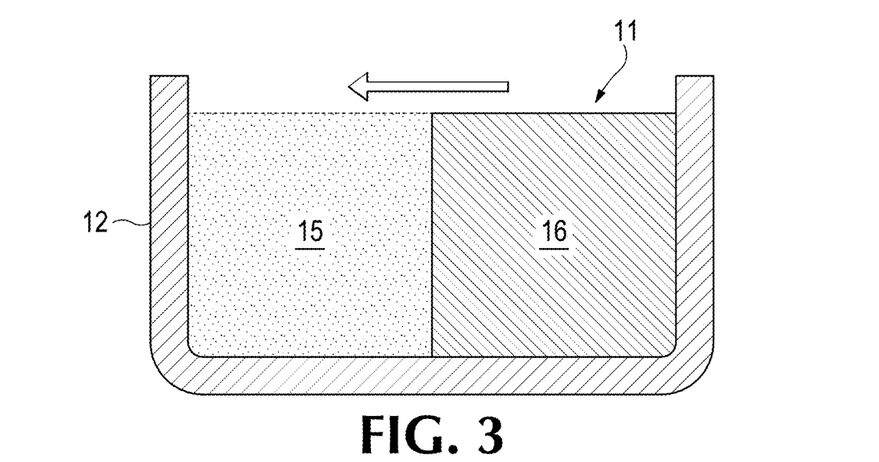
FIG. 3 is a schematic illustration showing an example of horizontal infiltration to form a wear resistant composite material, according to one embodiment of the present invention.

Various infiltration methods may be utilized as described below. FIGS. 1-3 illustrate various infiltration configurations according to various embodiments, each schematically illustrating a molten matrix material 16 infiltrating a porous hard material 15 in a cavity 11 of a mold 12. FIG. 1 illustrates downward vertical infiltration, in which gravity assists the infiltration. However, because the infiltration is mainly driven by capillary action, horizontal infiltration, upward vertical infiltration, outward/radial infiltration, and other infiltration configurations which may not utilize gravity or may work against gravity may be used. FIG. 2 illustrates an example of upward vertical infiltration, and FIG. 3 illustrates an example of horizontal infiltration. Other infiltration techniques can be utilized. Other techniques and products such as taught in US Publication 20130196169 and U.S. Pat. No. 9,561,562, which are incorporated herein by reference in their entirety, can be practiced and/or made through the use of $B_4C$ as a wear-resistant material in a hardfacing coating.

Figure 4:
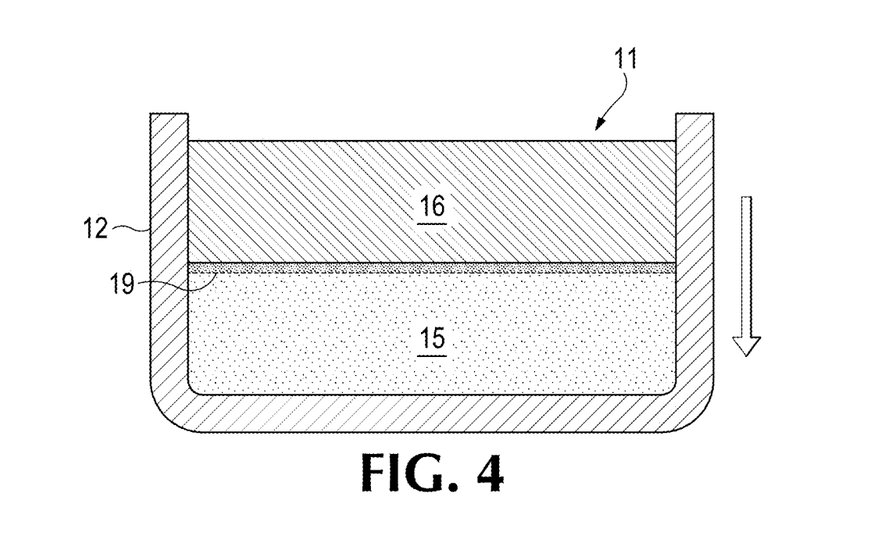
FIG. 4 is a schematic illustration showing an example of vertical infiltration from above similar to FIG. 1 with a layer of material to compress the hard particles during infiltration.

When infiltrating boron carbide, the hard particles to be infiltrated are of lower density than a copper based molten matrix material. The particles of low density may float in the liquid matrix and the particle density at the bottom of the molten pool may be lower than the density at the top of the pool. To ensure a constant volume fraction of hard particles through a finished product, a layer of heavier material can optionally be disposed over the lighter particles. As shown in FIG. 4, a layer of heavy particles 19 (e.g., tungsten carbide) can be positioned above the boron carbide particles 15. A layer of matrix material 16 may be placed above the heavy particles 19 and/or adjacent the particles. The lighter particles, which may float in the liquid matrix, are held down by the heavier particles ensuring a more even density through the composite material as the matrix material solidifies. As the assembly is heated and the matrix material infiltrates the particles, the heavy and light particles will generally remain stratified without mixing.

$B_4C$ is lower in density than many matrix metals suitable for infiltration. The density of boron carbide is 2.5 grams/cubic centimeter. The density of, for example, 34 Mn-66 Cu is 7.7 grams/cubic centimeter and slightly lower when liquid. The density of solid steel is about 7.8 grams/cubic centimeter and tungsten carbide is 15.6 grams/cubic centimeter.

In one example, the lighter particles 15 can be boron carbide and the heavier particles 19 tungsten carbide. The infiltrated tungsten carbide particles have similar abrasive and hardness properties as the boron carbide particles and will function similarly in the finished product. The heavier particles can comprise other materials such as tungsten metal or steel. A steel layer above lighter particles can weigh down or compress the lighter particles during infiltration with the matrix alloy. The steel material is generally porous to allow the matrix material to flow through. Once infiltrated, if a finished surface or a mating surface is required, the steel in the matrix material can be machined after processing. Removal of the heavier material is not necessary. Alternatively, the heavy particles 19 can be positioned above the matrix material 16 rather than directly above the hard particles. Other combinations of particles can be used.

In one embodiment, the matrix material is superheated 25° C. to 75° C. greater than its melting temperature. The holding time period for the infiltration may be for example from 1 to 60 minutes, with greater infiltration distances generally utilizing longer infiltration times. In one embodiment, the infiltration may optionally be conducted in an inert atmosphere, such as argon (Ar), which can avoid oxidation of the heated materials. In another embodiment, infiltration may optionally be carried out in a vacuum. In such cases, heating preferably begins at vacuum levels of $1.3 \times 10^{-5}$ to $1.3 \times 10^{-7}$ kPa ($10^{-4}$ to $10^{-6}$ Torr), but as the melting temperature of the infiltrant material is approached, a small partial pressure of argon (e.g. 1 Torr) may optionally be introduced to suppress evaporation of the infiltrant material components as well as boiling and splattering in the molten state. Various atmospheres that may be used for infiltration are discussed in greater detail below. After infiltration, the part may be cooled to room temperature. Alternatively, the matrix material can be heated to a higher or lower temperature initially. Alternatively, the materials can be heated to temperature in an ambient atmosphere.

In one example, a copper-manganese alloy is used as the matrix material. During infiltration the molten alloy contacts the boron carbide particles to form a manganese compound on the particle surfaces. Where an alloy of 60-70% wt.percent copper is used as the matrix material, a majority of the manganese can react with the surface of the boron carbide particles.

Boron carbide is resistant to wetting by many molten metals. Regardless of the form of application, the manganese reacts with the boron carbide and forms an intermediate layer that can bond to both the hard particle and the copper rich matrix material. As noted above, the copper may be combined or replaced with silver, gold, platinum and/or palladium.

Where manganese promotes wetting of the hard particles by the matrix material, depletion of the manganese from the matrix can limit the depth of infiltration. Excess manganese in the matrix material may provide an increase in depth of penetration and wetting by the matrix material. Alternatively, or in addition, coating the hard particles with manganese, a manganese compound or other appropriate material prior to processing can promote wetting and penetration by the matrix material, and reduce the percentage or need for manganese in the infiltrant material. Manganese particles (or in another form) may also be provided (e.g., mixed) with the boron carbide particles in addition to or in lieu of being in the matrix. This can cause particle subsidence issues described earlier.

Alternatively, manganese or a manganese compound can be deposited on the boron carbide particles by evaporation or other methods to promote wetting and infiltration by the matrix materials.

After precipitation of the manganese, the matrix material between the boron carbide particles can be on the order of 90-100% copper. Copper alloys generally have melting points below the melting point of the constituent elements. The melting point of eutectic copper manganese alloy is 871° C. and the processing temperature for infiltration can be approximately 900° C. The melting temperature of unalloyed copper is 1085° C. With precipitation of the melting point depressant (manganese) from the melt, the concentration of copper and the melting temperature of the matrix material increases above the processing temperature. The matrix material then solidifies.

Replenishing manganese in the matrix alloy solution can increase penetration depth. Manganese in the form of manganese particles or manganese alloy can be mixed with the hard particles. As the molten matrix material advances depleting manganese in the matrix, the manganese distributed with the hard particles dissolves in the molten matrix to replenish the manganese. Mixing matrix material in with the hard particles can displace the hard particles as the matrix material melts affecting dimensions of the finish product as described above. Using finer manganese or manganese alloy particles that can occupy interstices between the hard particles can limit dimensional instability. Alternatively, or in addition, boron carbide particles can include a manganese coating before infiltration.

Depending on the nature of the materials involved, particularly the substrate material, post processing heat treatment may be desirable. Depending on the substrate material, heat treatments such as annealing, normalizing, hardening followed by tempering, or martempering followed by tempering of the substrate may be performed according to known techniques without altering the composite coating material. It is generally undesirable for these heat treatments to be carried out above the melting temperature of the matrix material. The increase in matrix melting temperature described above may thus be advantageous.

Figure 5:
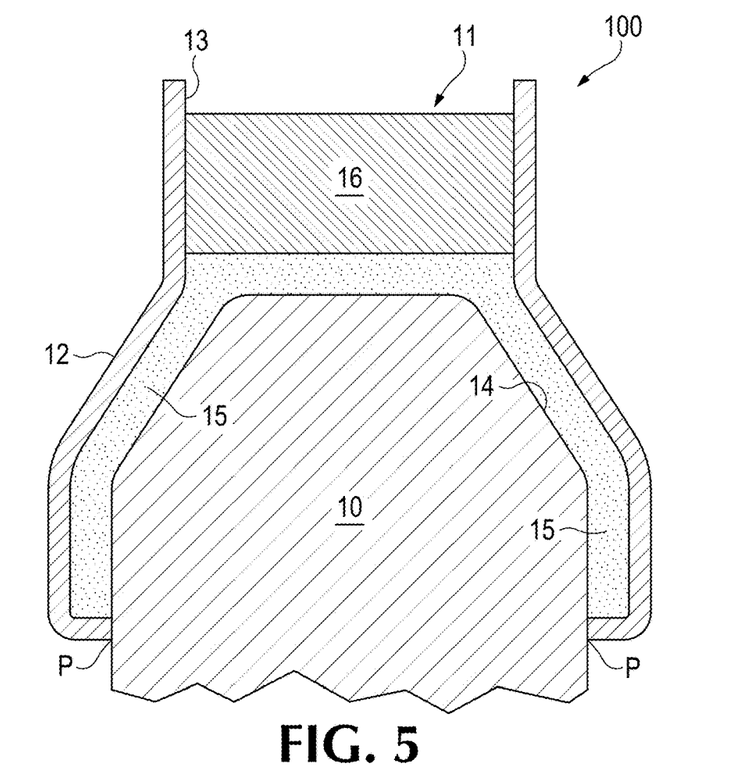
FIG. 5 is a schematic illustration showing one embodiment of a system and method of forming a wear resistant composite material on a substrate using vertical infiltration, prior to infiltration.
Figure 6:
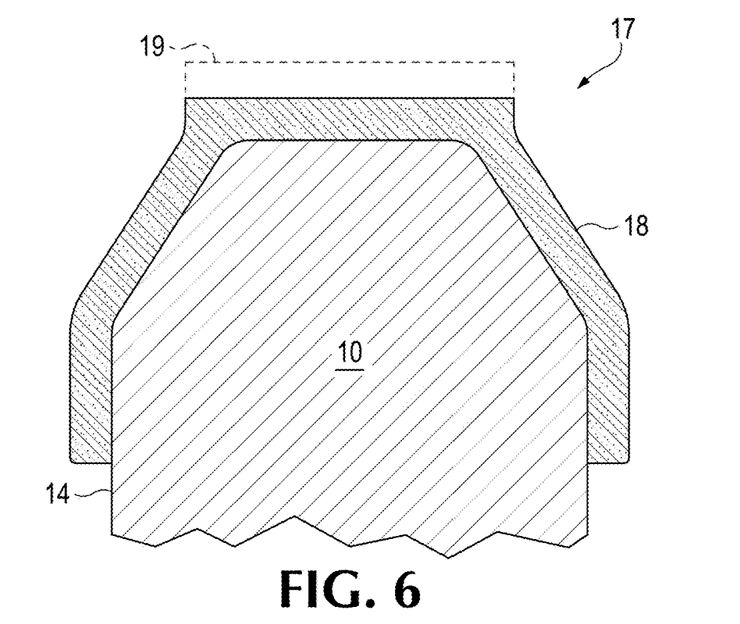
FIG. 6 is a schematic illustration showing the substrate having the wear resistant composite material formed thereon using the embodiment as shown in FIG. 5, after infiltration.

FIGS. 5 and 6 illustrate a system or assembly 100 for forming a wear resistant composite material. In this embodiment, the substrate 10 (e.g. a point of an excavating tool) is positioned within a cavity 11 of a mold 12, such that the mold 12 entraps a volume in the cavity 11 between the inner surface 13 of the mold 12 and the outer surface 14 of the substrate 10, as shown in FIG. 5. The substrate 10 may be prepared beforehand, such as by cleaning and drying to remove oil or greasy substances and/or grit blasting using metal grit to remove oxide scales and make the surface grainy so the matrix material bonds well to the substrate 10. The mold 12 may be made from any suitable material, such as a high-melting point metallic material either uncoated or coated to prevent reaction with the infiltrant material, a ceramic material, or graphite. When using a metal mold, the mold 12 may be welded, brazed, or otherwise connected to the outer surface 14 of the substrate 10, such as by welding at points P. In one embodiment, the mold 12 is a steel shell that is welded to the substrate to create the cavity 11; the shell may be grit blasted prior to welding in order to avoid contamination of the mold cavity 11. In this embodiment, the shell can form a part of the finished product.

The porous hard material 15 is inserted into the mold cavity 11 in contact or otherwise in communication with the outer surface 14 of the substrate 10, such as in the form of a particulate material or a preform, as shown in FIG. 5. The matrix material 16 is placed in communication with the porous hard material 15 and the outer surface 14 of the substrate. The matrix material 16 may be positioned within the mold cavity 11, such as by simply placing the matrix material 16 on top of the porous hard material 15 in solid form, as shown in FIG. 5. In one embodiment, the matrix material 16 may be in block or billet form. In another embodiment, the matrix material 16 may be positioned in a feeder or injection structure. In another embodiment, the matrix material may be spaced from the porous hard material by an intervening material such as the dense particles 19. The system 100 may then be prepared for infiltration, as described above, such as by placing the system 100 in a furnace for heating, which may include an inert atmosphere (e.g. argon or nitrogen), or vacuum. A tray, fixture or similar vessel may be used to support the system 100 in the furnace, such as a stainless steel or graphite tray. During infiltration, the matrix material 16 melts and infiltrates downward through the porous hard material 15, eventually contacting the outer surface 14 of the substrate 10.

After infiltration has been conducted and the system 100 is cooled, a part 17 having a composite coating 18 on the outer surface 14 is formed, as shown in FIG. 6. The part 17 may be removed from the mold 12, which may require cutting or breaking the mold 12 away if welded to the substrate 10 and/or bonded to the coating 18. However, the mold may in some embodiments remains attached to the substrate and coating as an expendable surface quickly worn away during use. The composite coating 18 contains the hard material 15 bound together and connected to the substrate 10 by the matrix material 16. In one embodiment, the hard material 15 may have a volume fraction of 5-95% in the composite material 18. In another embodiment, the hard material 15 may have a volume fraction of 30-85%.

The composite coating 18 may be formed with wide range of thicknesses, depending on the desired application. In one embodiment, a part 17 may be formed with a composite coating 18 that is about 1.2 cm. (0.5 in.) thick, which may be usable in a wide variety of applications. The part 17 may be a point, shroud, edge, or other portion of a piece of equipment that sustains repeated impacts and stress, and the wear resistance and toughness of the composite coating 18 enhances performance in such applications. Excavating/mining equipment represents one example of an application for a part produced according to the systems and methods described herein. Alternatively, the coating can be up to 19 cm (7.5 in) thick or greater. The substrate is preferably thicker than the applied hard composite material.

Figure 7:
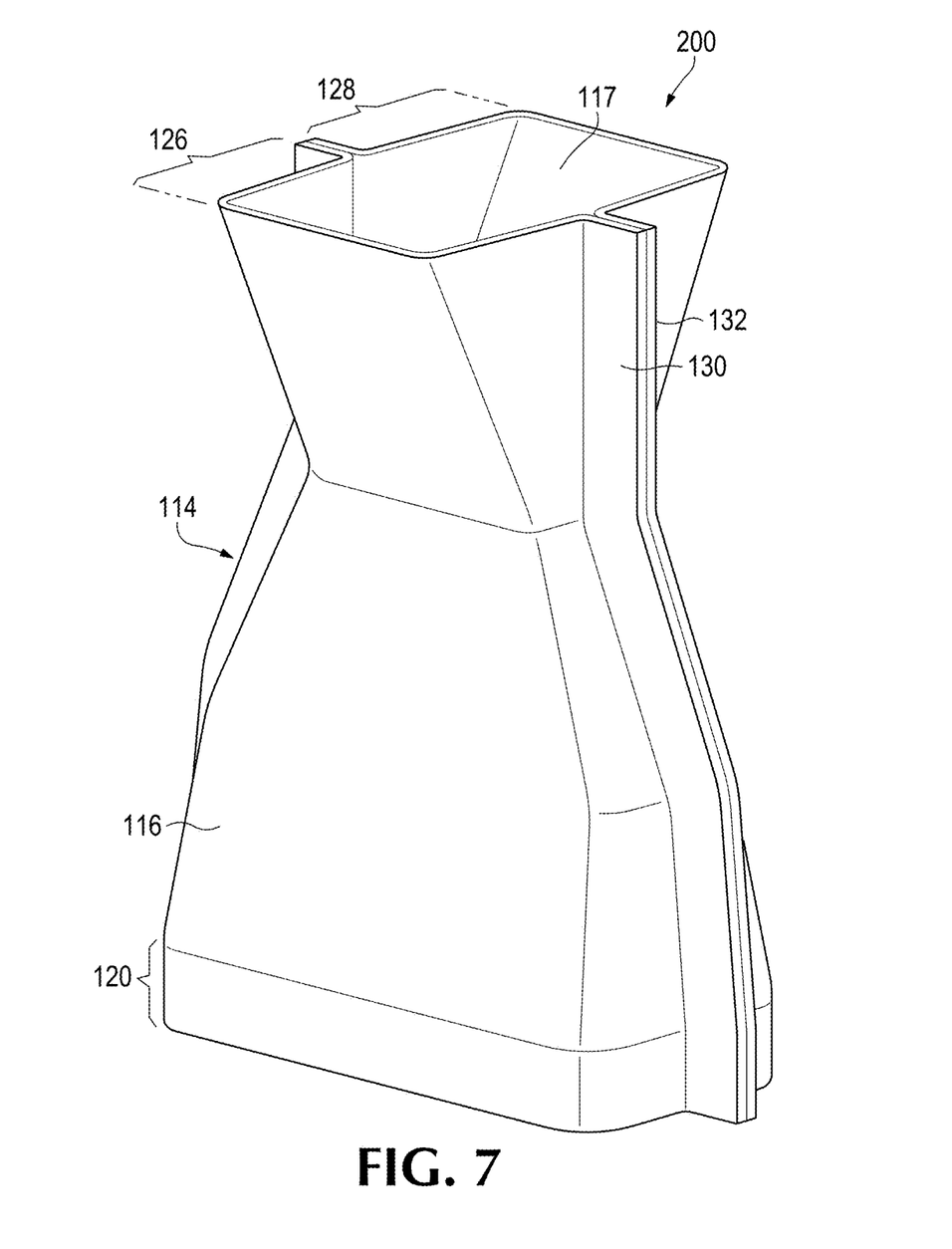
FIG. 7 is a perspective view of one embodiment of a shell configured for use as a mold in one example of forming a wear resistant composite material on a part.
Figure 8:
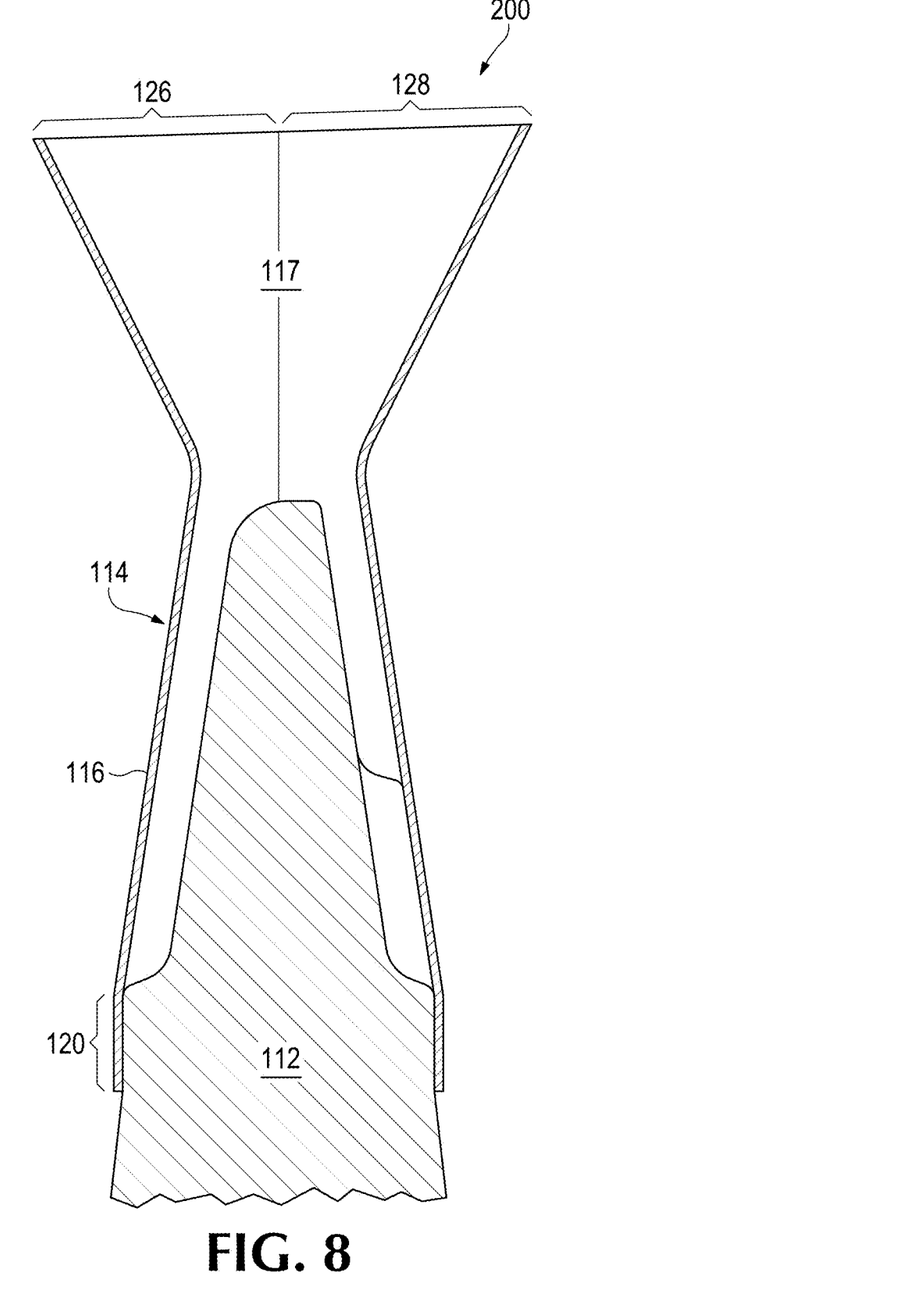
FIG. 8 is a cross-sectional view of the shell of FIG. 7 connected to one embodiment of a substrate in the form of a point for excavating or mining equipment, configured for use in forming a wear resistant composite material.
Figure 9:
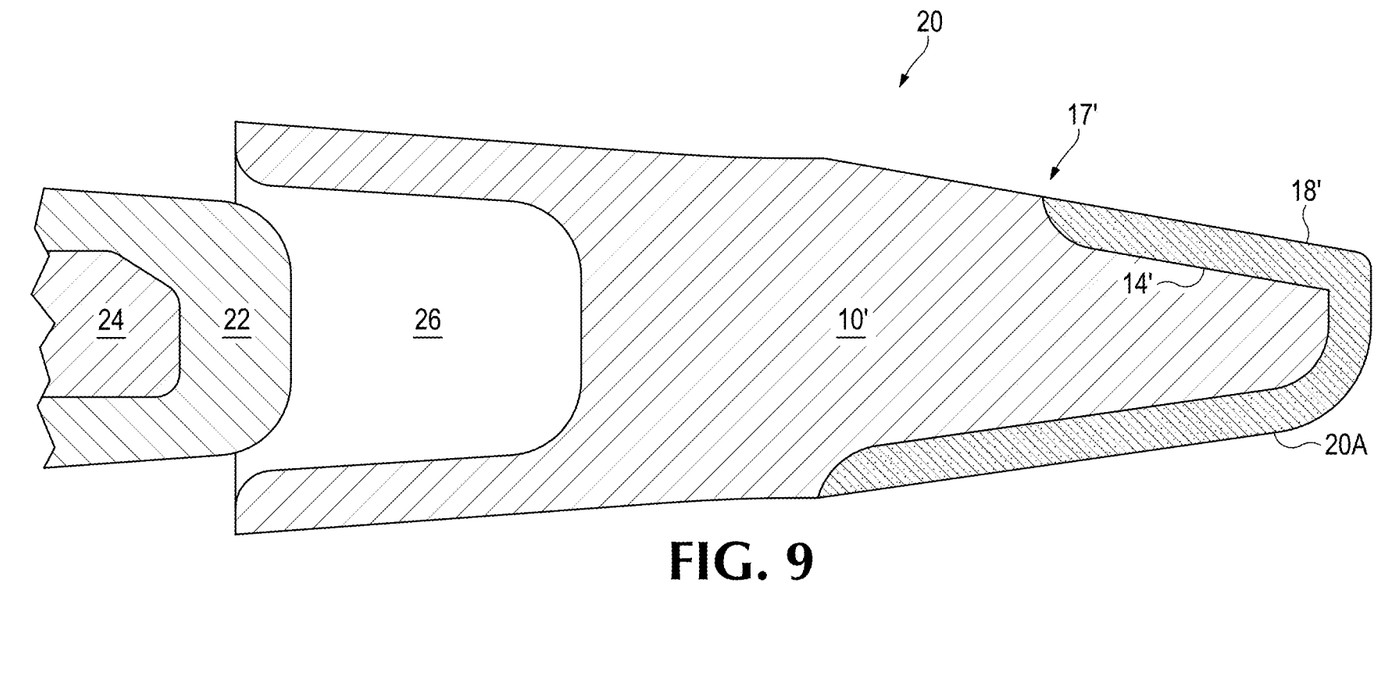
FIG. 9 is an exploded cross-sectional view of a wear member having the wear resistant composite material formed thereon using an infiltration method and a base on a lip to be received by the wear member.

FIGS. 7 and 8 illustrate another example of a system 200 for forming a composite material on an outer surface 14 of a substrate 10 mainly through downward vertical infiltration. The system 200 of FIGS. 7 and 8 utilizes a mold in the form of a shell 114 made from a sheet material, which is shown being used in conjunction with a substrate 112 in the form of an excavating/mining point that may be similar to the substrates 10, 10' as shown in FIGS. 5, 6 and 9. The shell 114 may be utilized to form a composite coating 18 as similarly described above and shown in FIGS. 5 and 6. In one embodiment, the porous hard material 15 may be poured through the opening 117 in the shell 114, and the matrix material 16 may thereafter be placed on top of the porous hard material 15, as similarly shown in FIG. 5. The opening 117 may have a funnel-like configuration to aid insertion of the porous hard material 15 and/or the matrix material 16. In other embodiments, the opening 117 may be located elsewhere on the shell 114, such as if the shell 114 is positioned in a different orientation during brazing. In an alternative embodiment, a layer of material 19 more dense than the porous hard material may be positioned on the porous hard material 15 or on the matrix material 16 to ensure a more constant density of particles through the finished product.

FIG. 9 illustrates a tool 20 with a composite coating in the form of a wear member for earthmoving equipment (e.g., a steel mining point) with a working portion forming the substrate 10' overlaid on its outer surface 14' with a wear resistant composite material layer 18' as described above. The tool includes a forward working portion to engage earthen materials and a rearward opening cavity 26 to receive a base 22 mounted on a lip 24 of excavating equipment. In one embodiment, the composite material layer 18' consists of boron carbide either by itself or combined with other wear resistant material in a copper manganese alloy matrix material. A lock (not shown) can be used to secure the tool 20 to the base 22.

The shell 114 may be made of any material capable of being formed or fabricated to a desired shape and capable of withstanding dissolution, melting, or undue weakening by the infiltrating material, or generally by the temperatures required for infiltration brazing, during the infiltrating process. In one example, the shell 114 may be formed of low-carbon "mild" steel. For example, shell 114 may, for example, have an average shell thickness of approximately 0.25 cm (0.105 in.). In one embodiment, the shell 114 may be made of sheet metal in the range of 16 Ga (0.15 cm. thick) to 10 Ga (0.34 cm. thick), which may be useful for a wide range of applications. In contrast, the substrate 112 in FIG. 8 may, for example, have a thickness ranging from 2.54 cm to 8.8 cm. (1.000 to 3.450 inches) in the region covered by the shell. In other embodiments, the shell 114 may have any other suitable thickness. The shell 114 may be cast, machined from bar stock, or formed in a different manner. Different portions of the shell 114 may have different thicknesses.

The relative thinness of the shell 114 when compared to the substrate 112 means that the shell 114 may be formed easily and relatively inexpensively. For simple shapes of a shell, a relatively low-cost shell 114 may be made by cutting pieces of sheet metal, and welding or brazing those pieces together. Slightly more complicated shapes may be made by bending pieces of sheet metal in particular configurations, and then welding the bent sheet metal pieces together. The shell can be bonded to the composite material and can be part of the wear member. The shell as a softer material than the underlying surface may be expendable and quickly wear away during excavating operations. The shell can provide a smooth surface finish for the wear part.

As shown in FIGS. 7 and 8, the shell 114 can, in one example, be formed of two parts, having a two-part conformal band 120, though other constructions are possible. A two-part shell body 116 of shell 114 may be initially formed from a front half piece 126 and a back half piece 128, having a front flange 130 or a rear flange 132, respectively. Front flange 130 extends transversely from the back edge of the front half 126 and rear flange 132 extends transversely from the front edge of the back half 128. Front flange 130 may be joined to rear flange 132 by welding or brazing with a brazing material having a higher melting temperature than the material intended for infiltration. The shell 114 may have a conformal band 120 configured to be placed in surface-to-surface contact with a portion of the surface of the substrate 112 around an entire periphery of the shell 114, such that the shell 114 is connected to the substrate 112 by welding or brazing at least at the conformal band 120, as described below. In other embodiments, the shell 114 may be formed of a single piece (in which flanges 130, 132 may not be present) or a larger number of pieces.

Alternatively, the composite material can be formed separately from the substrate as a preform and applied to the substrate by brazing or other attachment method. Alternatively, the composite material can be formed on a substrate such as a plate to form a tile. The plate with the composite material can then be welded to a surface. A set of tiles or plates with composite material could be welded or otherwise attached to a surface such as a bucket or a truck body to limit erosion of the surface.

Figure 12:
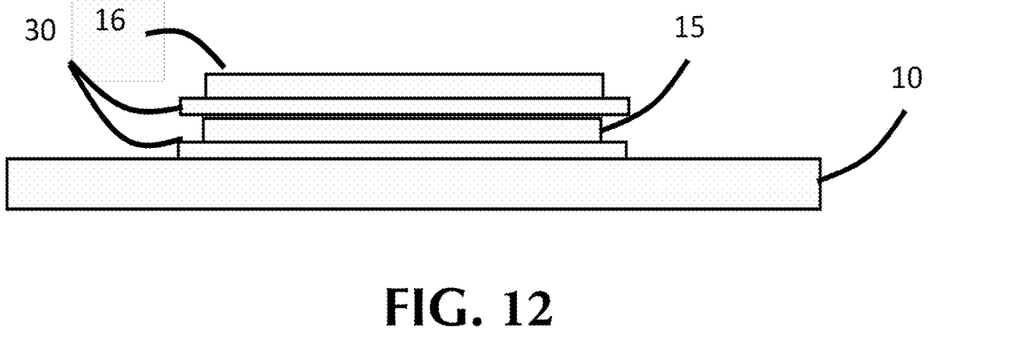
FIG. 12 is a schematic representation of an alternative method for making a composite material on a substrate.

Alternatively, the hard particles 15 may be deposited on a transfer material 30 such as a fabric or tape such as paper, nylon, PTFE or other material as shown in FIG. 12. Similarly, the matrix particles 16 can be deposited on a separate fabric or tape 30. The hard material and the matrix materials can be consolidated and retained by a binder that allows handling of the tapes with limited dispersion of the bound materials. The tape with hard particles can be placed on a substrate to receive the composite material. The tape with the matrix material is placed over the hard material. The tape could have an adhesive surface that allows the tapes to be positioned and maintain their position in relation to the substrate and to each other. The substrate with the stacked tapes are then heated in an oven to melt the matrix material using methods described above. The tape and binder are consumed on heating in the furnace. The matrix material on reaching a melting temperature will infiltrate the hard particles underneath binding them together and binding to the substrate on cooling to create a composite material.

The infiltration of the porous hard material as described above is mainly driven by capillary action, i.e. capillary pressure acting on the infiltration front. The pressure differential at the infiltration front can depend on many factors including, for example, surface tension of the molten matrix material, contact angle of the molten matrix material with respect to the porous hard material, geometric characteristics of the porous hard material (e.g. porosity, tortuosity, variation in pore size and shape, and its effect on the apparent contact angle of the molten material), and the pressure of any residual gas within the porous hard material. The freedom to control many of these factors may be limited within a specific matrix/filler system. Residual gas pressure can be at least partially controlled, and minimization of residual gas pressure within the porous hard material can maximize the pressure differential and the driving force for capillary action. This, in turn, can maximize the potential distance that the matrix material can infiltrate the porous hard material. In at least some configurations, the use of porous hard material in the form of a preform or preforms may maximize the infiltration distance as compared to other forms of porous hard material.

In some embodiments for forming a wear resistant composite material, different atmospheres are used during the infiltration operation to control and/or minimize the residual gas pressure in the porous hard material. In these embodiments, the infiltration is performed in a furnace with a chamber holding the mold, the matrix material, and the porous hard material, where the atmosphere inside the chamber can be controlled. It is understood that the assembly may further include a substrate that is in communication with the mold as described below.

The atmosphere in the operation can be controlled to assist in achieving a capillary pressure gradient that is sufficient to drive infiltration of the matrix material over larger/longer distances through the porous hard material. In this embodiment, the chamber is substantially evacuated prior to melting of the matrix material. Evacuation at least in the beginning of the infiltration process is preferred in one embodiment to avoid or minimize oxidation of the assembly's components. Different procedures may be used in other embodiments, such as not evacuating or evacuating to a lesser degree than discussed above.

In one embodiment, the entire chamber is evacuated prior to melting of the matrix material and is maintained under vacuum conditions throughout the infiltration process. In another embodiment the gas pressure after evacuation may be from 0.0001 to 0.0010 kPa or may be as low as $1 \times 10^{-5}$ kPa. In another embodiment the chamber pressure can be 0.00001 to 0.0010 kPa. The evacuation of the chamber prior to melting of the matrix material can reduce or eliminate residual gas pressure in the porous hard material, which assists in driving infiltration through capillary action. Residual gas within the porous hard material may limit the length of infiltration that can be achieved through capillary action.

In one embodiment, the chamber is evacuated as described above prior to the infiltration process. After the matrix material has melted, a partial pressure of argon gas (or another non-reactive gas such as nitrogen) is introduced into the chamber. The Ar gas can be fed into the chamber until the Ar partial pressure reaches about 0.07-0.01 kPa. The evacuation of the chamber prior to melting of the matrix material to reduce or eliminate residual gas pressure in the porous hard material, can assist in driving infiltration as described above. The later introduction of Ar gas can assist in reducing evaporation and splattering of the infiltrant material or its components.

In another embodiment where the wear resistant material particles are not wetting-compatible with the matrix material, the wear resistant material particles may be coated with wetting-compatible coatings before they are used for forming the composite material by infiltration brazing.

As used herein, the terms "matrix material" and "hard material" should not be considered to imply that the matrix material or the hard material forms any specific proportion of the composite material. For example, the matrix material need not form a majority or a plurality of the composite material, and the hard material may form a majority or a plurality of the composite material in some embodiments.

It is understood that the "surface" of a substrate as described herein may include a plurality of different surfaces or sides, and does not imply any specific contour to such surface(s) unless explicitly noted. The substrate can be any material with a melting point that is suitable for the application of the hardfacing; for example, in an infiltration process, the substrate preferably has a melting point that is higher than the matrix material. Examples of such substrates include cast, wrought, and powder metallurgy-produced metallic materials, as well as ceramics and ceramic-based materials such as metallized ceramics. In one embodiment, the substrate may be carbon steel, alloy steel, stainless steel, or tool steel. The system and method can alternately be used to form the wear resistant composite material as a unitary piece.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. Relative terms such as "top," "bottom," etc., as used herein, are intended for illustrative purposes only and do not limit the embodiments in any way.

Nothing in this specification should be construed as requiring a specific three dimensional orientation of structures in order to fall within the scope of this invention, unless specifically recited in the claims. Also, the reader is advised that the attached drawings are not necessarily drawn to scale. Additionally, the term "plurality," as used herein, indicates any number greater than one, either disjunctively or conjunctively, as necessary, up to an infinite number. Further, "Providing" an article or apparatus, as used herein, refers broadly to making the article available or accessible for future actions to be performed on the article, and does not connote that the party providing the article has manufactured, produced, or supplied the article or that the party providing the article has ownership or control of the article. Accordingly, while specific embodiments have been illustrated and described, numerous modifications come to mind without significantly departing from the spirit of the invention and the scope of protection is only limited by the scope of the accompanying Claims.

The invention claimed is:

1. A hardfaced product comprising
a substrate and
a hard composite material bonded to the substrate, wherein the composite material includes boron carbide as a wear-resistant material and a matrix alloy including approximately 34% by weight manganese and approximately 66% by weight copper with any other additional element being 0.01% to 2% by weight.

2. The hardfaced product of claim 1 wherein the composite material includes boron carbide as particles in the matrix alloy.

3. The hardfaced product of claim 2 wherein the boron carbide particles sizes are between 0.1 μm and 5 mm.

4. The hardfaced product of claim 2 wherein the boron carbide particles sizes are on average 500 μm.

5. The hardfaced product of claim 2 wherein the boron carbide particles are 30-80 volume % of the composite material.

6. The hardfaced product of claim 1 wherein the substrate is thicker than the composite material where the composite material is applied.

7. The hardfaced product of claim 1 wherein the substrate is in the form of a ground engaging product usable on earth working equipment.

8. The hardfaced product of claim 1 wherein the substrate is in the form of a point including a rearward-opening cavity for mounting the point on earth working equipment, and a working portion forward of the cavity.

9. The hardfaced product of claim 1 wherein the substrate includes a mounting portion and a working portion, and the composite material is bonded to the working portion.

10. The hardfaced product of claim 1 wherein the boron carbide is infiltrated by the matrix alloy.

11. The hardfaced product of claim 1 including a metal shell welded or brazed to the substrate to sandwich the composite material between the substrate and the shell.

12. The hardfaced product of claim 1 wherein the substrate is steel.

13. A hardfaced product comprising
a substrate and
a hard composite material bonded to the substrate, wherein the composite material includes boron carbide particles as a wear-resistant material and a matrix alloy including 34% by weight manganese and 66% by weight copper.

14. The hardfaced product of claim 13 wherein the boron carbide particles sizes are between 0.1 μm and 5 mm.

15. The hardfaced product of claim 13 wherein the boron carbide particles sizes are on average 500 μm.

16. The hardfaced product of claim 13 wherein the substrate is in the form of a ground engaging product usable on earth working equipment.

17. The hardfaced product of claim 13 wherein the substrate is in the form of a point including a rearward-opening cavity for mounting the point on earth working equipment, and a working portion forward of the cavity.

18. The hardfaced product of claim 17 wherein the composite material is bonded to the working portion.

19. The hardfaced product of claim 13 wherein the boron carbide is infiltrated by the matrix alloy.

20. A hardfaced product comprising
a substrate and
a hard composite material bonded to the substrate, wherein the composite material includes a wear-resistant material and a matrix alloy binding the wear resistant material together, wherein the wear-resistant material includes boron carbide particles, and wherein the matrix alloy includes 60-70% by weight copper and the balance manganese with any other additional element being 0.01% to 2% by weight.

21. The hardfaced product of claim 20 wherein the boron carbide particles sizes are between 0.1 μm and 5 mm.

22. The hardfaced product of claim 20 wherein the boron carbide particles sizes are on average 500 μm.

23. The hardfaced product of claim 20 wherein the substrate is in the form of a ground engaging product usable on earth working equipment.

24. The hardfaced product of claim 20 wherein the substrate is in the form of a point including a rearward-opening cavity for mounting the point on earth working equipment, and a working portion forward of the cavity.

25. The hardfaced product of claim 24 wherein the composite material is bonded to the working portion.

26. The hardfaced product of claim 20 wherein the boron carbide is infiltrated by the matrix alloy.

\* \* \* \* \*